United States Patent
Kuenzi et al.

(10) Patent No.: US 11,880,447 B2
(45) Date of Patent: Jan. 23, 2024

(54) REGIONAL LOCK-STATE CONTROL SYSTEM

(71) Applicant: Carrier Corporation, Palm Beach Gardens, FL (US)

(72) Inventors: Adam Kuenzi, Silverton, OR (US); Smita Menon, Lake Oswego, OR (US); Jonah J. Harkema, Newberg, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/067,268

(22) Filed: Dec. 16, 2022

(65) Prior Publication Data

US 2023/0123495 A1 Apr. 20, 2023

Related U.S. Application Data

(62) Division of application No. 16/619,868, filed as application No. PCT/US2018/035940 on Jun. 5, 2018, now Pat. No. 11,574,042.
(Continued)

(51) Int. Cl.
*H04L 29/06* (2006.01)
*G06F 21/44* (2013.01)
(Continued)

(52) U.S. Cl.
CPC .............. *G06F 21/44* (2013.01); *G07C 9/27* (2020.01); *H04W 12/08* (2013.01); *H04W 12/30* (2021.01); *H04W 12/64* (2021.01)

(58) Field of Classification Search
CPC ...................................................... G06F 21/44
See application file for complete search history.

(56) References Cited

U.S. PATENT DOCUMENTS

| | | | |
|---|---|---|---|
| 7,277,018 B2 | 10/2007 | Reyes et al. | |
| 7,501,930 B2 | 3/2009 | Cote et al. | |

(Continued)

FOREIGN PATENT DOCUMENTS

| | | |
|---|---|---|
| CN | 104950687 A | 9/2015 |
| CN | 205722058 U | 11/2016 |

(Continued)

OTHER PUBLICATIONS

"Complete Doorway Solutions"; Security, Life-Safety, Sustainability & Design; Assa Abloy; 19 Pages.
(Continued)

*Primary Examiner* — Jason K Gee
(74) *Attorney, Agent, or Firm* — CANTOR COLBURN LLP

(57) ABSTRACT

A regional lock-state control system for operation within a region, includes a server, a plurality of mobile devices and a plurality of lock assembles. The server is configured to initiate a lock-state event. The mobile devices are each configured to receive a wireless lock-state directive from the server upon the lock-state event, and send a wireless lock lock-state directive to the server. The lock assemblies are each configured to receive a lock-state command associated with the lock-state directive from the plurality of mobile devices, and are each configured to transmit an advertisement that includes data on a lock-state.

9 Claims, 4 Drawing Sheets

Related U.S. Application Data

(60) Provisional application No. 62/515,781, filed on Jun. 6, 2017.

(51) Int. Cl.
| | | |
|---|---|---|
| *H04W 12/08* | (2021.01) | |
| *G07C 9/27* | (2020.01) | |
| *H04W 12/64* | (2021.01) | |
| *H04W 12/30* | (2021.01) | |

(56) References Cited

U.S. PATENT DOCUMENTS

| | | | |
|---|---|---|---|
| 9,354,619 | B2 | 5/2016 | Ergenbright et al. |
| 9,449,490 | B2 | 9/2016 | Dodson |
| 9,454,890 | B2 | 9/2016 | Lyman et al. |
| 2010/0031714 | A1 | 2/2010 | Brown et al. |
| 2010/0039220 | A1 | 2/2010 | Davis |
| 2014/0049363 | A1 | 2/2014 | Ahearn et al. |
| 2014/0266721 | A1* | 9/2014 | Nickles ................ G08B 21/02 340/541 |
| 2014/0365574 | A1 | 12/2014 | Franks et al. |
| 2015/0146002 | A1* | 5/2015 | Cruz ................ G08B 13/19632 348/156 |
| 2015/0207864 | A1 | 7/2015 | Wilson et al. |
| 2015/0379861 | A1 | 12/2015 | Demara, II et al. |
| 2016/0042581 | A1 | 2/2016 | Ku |
| 2016/0093130 | A1 | 3/2016 | Shen et al. |
| 2016/0232774 | A1 | 8/2016 | Noland et al. |
| 2017/0127222 | A1* | 5/2017 | Lang ..................... H04W 52/30 |
| 2018/0103189 | A1 | 4/2018 | Nguyen et al. |
| 2020/0107191 | A1 | 4/2020 | Kuenzi et al. |

FOREIGN PATENT DOCUMENTS

| | | |
|---|---|---|
| CN | 106780899 A | 5/2017 |
| WO | 2012116037 A1 | 8/2012 |
| WO | 2016089837 A1 | 6/2016 |

OTHER PUBLICATIONS

"School Lockdown Incident Management"; SwiftReach; 6 Pages.
"VIZpin Access Control and Visitor Management"; Powered by VIZpin; 3 Pages.
Chinese Office Action Issued in Chinese Application No. 201880051286.2 dated Jun. 3, 2021; 13 Pages.
International Search Report Issued in International Application No. PCT/US2018/035940 dated Sep. 7, 2018; 6 Pages.
Lindley; "Selling Schools on Access Control"; SD&I; Aug. 12, 2015; 18 Pages.
Written Opinion Issued in International Application No. PCT/US2018/035940 dated Sep. 7, 2018; 10 Pages.

* cited by examiner

REGIONAL LOCK-STATE CONTROL SYSTEM

CROSS REFERENCE TO RELATED APPLICATIONS

This application is a divisional of U.S. application Ser. No. 16/619,868, filed Dec. 5, 2019, which is a 371 National Stage of PCT/US2018/035940, filed Jun. 5, 2018, which claims the benefit of U.S. Provisional Application No. 62/515,781, filed Jun. 6, 2017, the contents of which are incorporated by reference herein in its entirety.

BACKGROUND

The present disclosure relates to a lock system, and more particularly, to a regional lock-state control system generally operable within a predefined region.

Traditionally, regional lock-state control systems, such as a lockdown system, may be used in predefined areas. Examples of such areas may be buildings, college campuses, and others. Upon a predefined event, all locks (e.g., door locks) that are part of the lockdown system may be automatically locked via a central controller. Unfortunately, once a lockdown event has occurred, the location of people in the area may not be well known.

BRIEF DESCRIPTION

A regional lock-state control system for operation within a region, the regional lock-state control system according to one, non-limiting, embodiment of the present disclosure includes a server configured to initiate a lock-state event; a plurality of mobile devices each configured to receive a wireless lock-state directive from the server upon the lock-state event, and send a wireless status message to the server; and a plurality of lock assemblies each configured to receive a lock-state command associated with the lock-state directive from the plurality of mobile devices, and each configured to transmit an advertisement that includes data on a lock-state.

Additionally to the foregoing embodiment, each one of the plurality of lock assemblies include a latch and the data on the lock-state includes locked and unlocked states of the latch.

In the alternative or additionally thereto, in the foregoing embodiment, each one of the plurality of lock assemblies include a deadbolt and the data on the lock-state includes thrown and un-thrown states of the deadbolt.

In the alternative or additionally thereto, in the foregoing embodiment, the lock-state control system is a lockdown control system, the lock-state event is a lockdown event, the wireless lock-state directive is a wireless lockdown directive, and the wireless lock-state command is a wireless lockdown command.

In the alternative or additionally thereto, in the foregoing embodiment, the data on a lock state includes locked and unlocked states, and the wireless lock command is sent to lock assemblies in the unlocked state, and not to lock assemblies in the locked state.

In the alternative or additionally thereto, in the foregoing embodiment, the plurality of mobile devices are smartphones.

In the alternative or additionally thereto, in the foregoing embodiment, the advertisement is a Bluetooth advertisement.

In the alternative or additionally thereto, in the foregoing embodiment, each one of the lock assemblies include a battery, and the advertisement includes data on battery status.

In the alternative or additionally thereto, in the foregoing embodiment, each one of the plurality of lock assemblies includes a computing processor configured to execute an authentication module for authenticating the lock-state command.

In the alternative or additionally thereto, in the foregoing embodiment, each one of the plurality of lock assemblies includes a wireless transceiver for re-transmitting the lock-state command to other lock assemblies of the plurality of lock assemblies.

In the alternative or additionally thereto, in the foregoing embodiment, the lock-state command is sent via short range communications.

In the alternative or additionally thereto, in the foregoing embodiment, each one of the plurality of lock assemblies includes a latch constructed and arranged to move between locked and unlocked states, and a deadbolt constructed and arranged to move between a thrown and un-thrown states, and wherein the data on the lock-state includes the locked, unlocked, thrown, and un-thrown states.

In the alternative or additionally thereto, in the foregoing embodiment, the regional lock-state control system includes a plurality of doors constructed and arranged to move between an open position and a closed position, and with each one of the plurality of lock assemblies being coupled to a respective one of the plurality of doors, and wherein the advertisement includes data on the open and closed positions.

In the alternative or additionally thereto, in the foregoing embodiment, the server is cloud-based.

A method of operating a regional lock-state system according to another, non-limiting, embodiment includes triggering a lock-state event by a control arrangement; wirelessly sending a lock-state directive to a plurality of mobile devices; wirelessly sending a lock-state command reflective of the lock-state directive by the plurality of mobile devices to a plurality of lock assemblies; and placing the plurality of lock assemblies in a lock-state associated with the lock-state command.

Additionally to the foregoing embodiment, the method includes transmitting an advertisement by each one of the plurality of lock assemblies, wherein each advertisement includes an address and the lock-state of the respective lock assembly.

In the alternative or additionally thereto, in the foregoing embodiment, the method includes scanning for the advertisement by the plurality of mobile devices.

In the alternative or additionally thereto, in the foregoing embodiment, the method includes sending a status message to the control arrangement indicative of the scanned advertisements by the plurality of mobile devices.

In the alternative or additionally thereto, in the foregoing embodiment, the lock-state directive is sent over a cellular network and the lock-state command is sent over a short range communication protocol.

In the alternative or additionally thereto, in the foregoing embodiment, the lock state command is propagated between the plurality of mobile devices, between the plurality of lock assemblies, and from the plurality of lock assemblies to the plurality of mobile devices.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
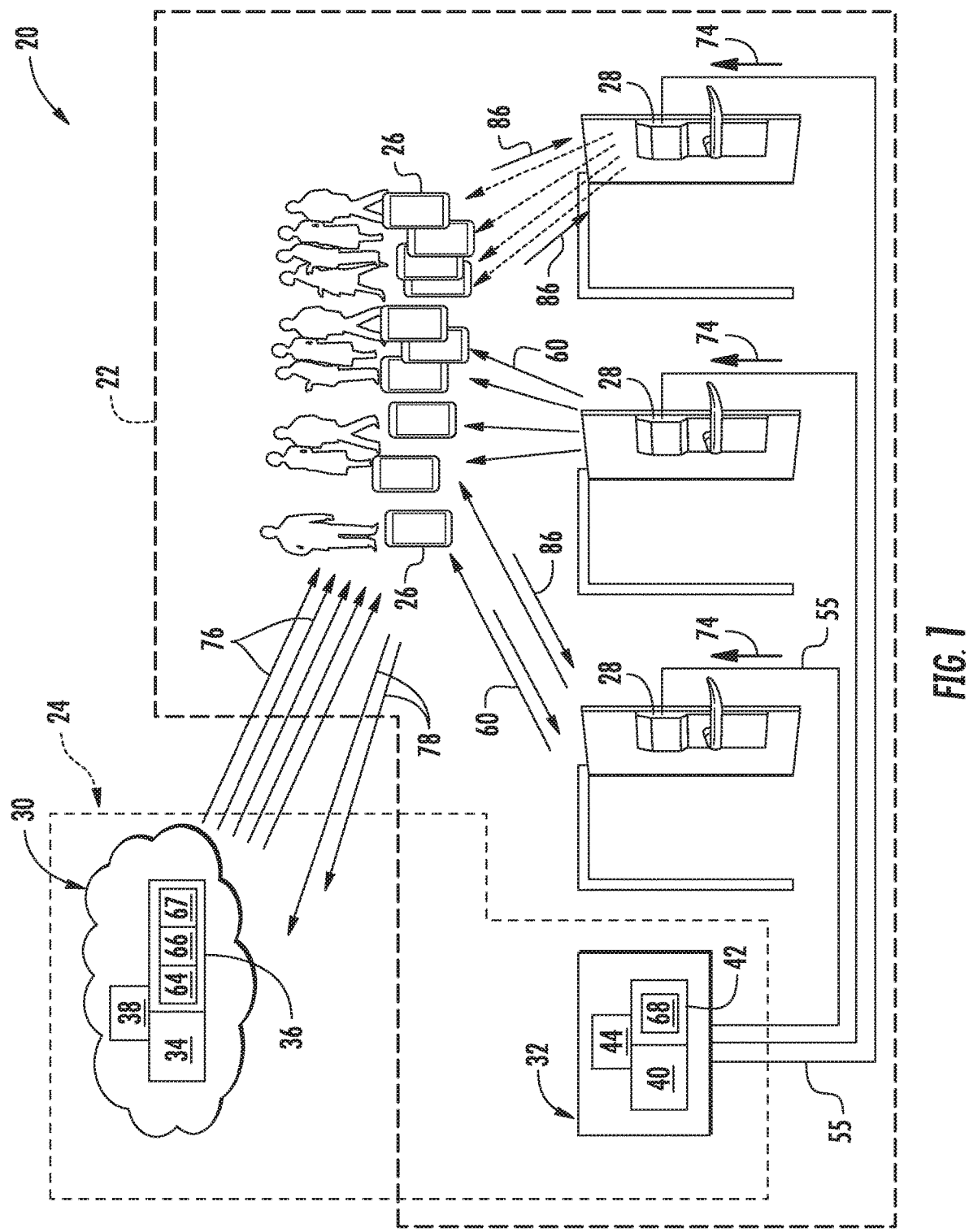
FIG. 1 is a schematic of a regional lock-state control system as one, non-limiting, exemplary embodiment of the present disclosure.

Referring to FIG. 1, a regional lock-state control system 20 may be operable within a region 22, and may include a control arrangement 24, a multitude of mobile devices 26, and a plurality of lock assemblies 28 that may be dispersed throughout the region 22. The regional lock-state control system 20 may be a regional lockdown system, or alternatively, may be a regional unlocking system. Examples of a region 22, may include an office building, a student campus, a hotel, and others. The control arrangement 24 may include a server 30 and a controller 32 that may be local and located within the region 22. The server 30 may be run remotely or locally, and/or may be cloud or web based. In one example, the server 30 may not be in direct communication with the local controller 32. It is further contemplated and understood that the controller 32 may be an integral part of the server 30 (i.e., may share the same processor and computer readable storage medium). Although the lock assembly 28 is illustrated as a door lock assembly, non-limiting examples of the lock assembly 28 may also include keyboxes, padlocks, core locks, Bluetooth modules, vaults, and others.

Figure 2:
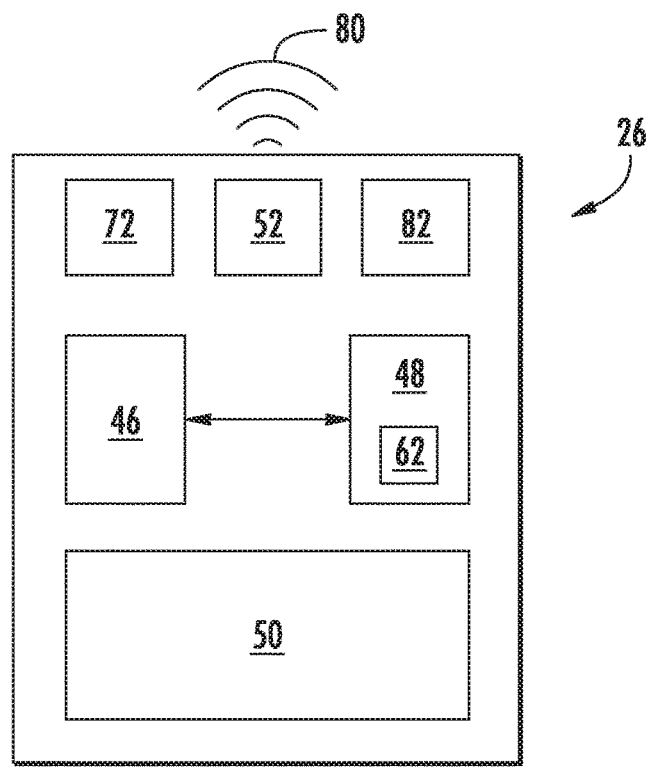
FIG. 2 is a schematic of a mobile device of the regional lock-state control system.

The remote server 30 may include a computing processor 34 (e.g., microprocessor), an electronic storage medium 36 that may be computer readable and writeable, and a transceiver 38 for wireless communications. The controller 32 may include a computing processor 40 (e.g., microprocessor), an electronic storage medium 42 that may be computer readable and writeable, and in some applications, a transceiver 44 for wireless communications. Referring to FIG. 2, each one of the mobile devices 26 may include a computing processor 46 (e.g., microprocessor), an electronic storage medium 48 that may be computer readable and writeable, a user interface 50, and a transceiver 52 for wireless communications.

In one embodiment, each one of the lock assemblies 28 may not be generally 'smart', and instead, may be generally powered, actuated, and controlled by the controller 32. In this embodiment, the local controller 32 may be hardwired to each lock assembly 28 (see hardwired pathways 55 in FIG. 1). In another example, each lock assembly may include and receives power via an energy storage device or battery (not shown). In yet another embodiment, and referring to FIG. 3, each one of the lock assemblies 28 may include a computing processor 54 (e.g., microprocessor), an electronic storage medium 56 that may be computer readable and writeable, and a transmitter 58 for transmitting an advertisement or beacon 60. In some applications, the transmitter 58 may be a transceiver for additional wireless communications.

Figure 3:
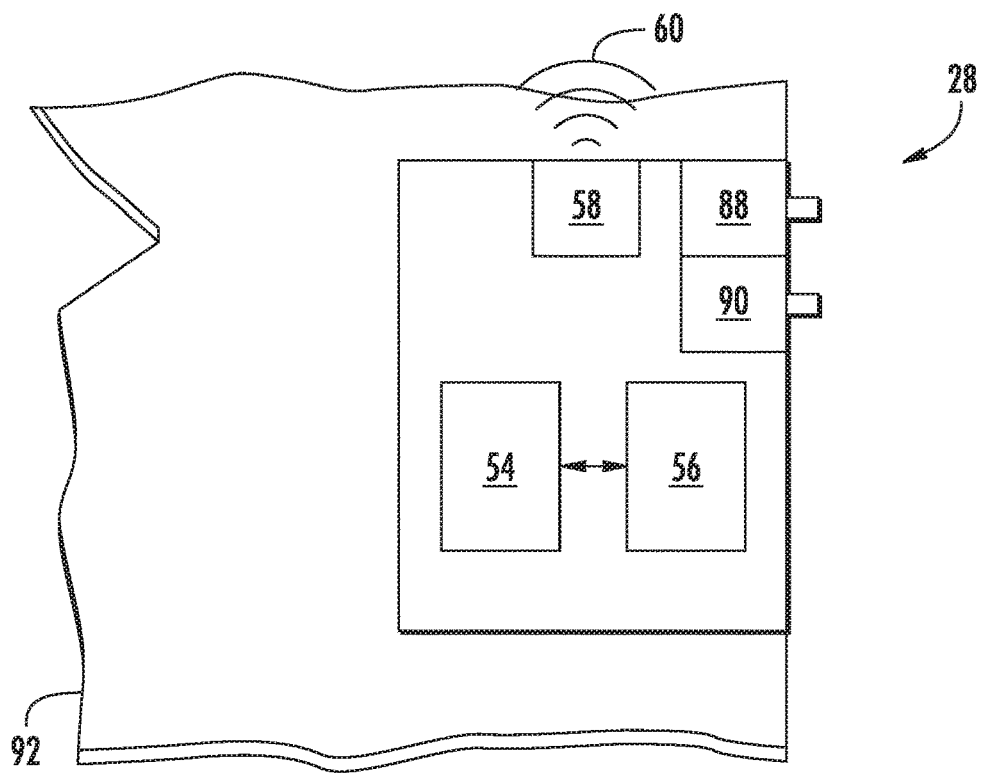
FIG. 3 is a schematic of lock assembly of the regional lock-state control system.

Referring to FIGS. 1 through 3, the regional lock-state control system 20 may further include a plurality of mobile device modules 62, a status module 64 that may be a lock status module, a people locator module 66, and a central lock control module 68. Each one of the plurality of mobile device modules 62 may be programmed into a respective one of the plurality of mobile devices 26 (i.e., stored in the medium 48 and executed by the processor 46). The status module 64 and the people locator module 66 may be programmed into the server 30 (i.e., stored in the medium 36 and executed by the processor 34). The central lock control module 68 may be programmed into the controller 32 (i.e., stored in the medium 42 and executed by the processor 40).

Each mobile device 26 may be generally carried by a respective person or user known to be in the region 22 for a length of time. In one example, the mobile device 26 may be a smartphone. In another embodiment, the mobile device 26 may be an integral part of an identification and/or access badge, or card. The mobile device 26 (e.g., smartphone, badge, or card) may be configured to operate any number of the lock assemblies 28 via techniques known to one having skill in the art. It is contemplated and understood that the mobile devices 26 may not be part of the regional lock-state control system 20, and instead, may be host devices used to execute the mobile device modules 62. Similarly, the server 30 may not be part of the regional lock-state control system 20, and instead, may be a host server used to execute the mobile device modules 64, 66 and store data of the system 20.

Referring to FIGS. 1 and 2, the people locator module 66 of the regional lock-state control system 20 may determine the location of mobile device users in the region 22 via one of two different techniques. The first technique may utilize the advertisement 60 and the second technique may utilize a geographic position application 72 of the mobile device 26. The geographic position application 72 is configured to determine the geographic position of the mobile device 26 using one or more positioning systems or protocols of a type well known in the art, such as Global Positioning Systems (GPS), Global Navigation System (GLONASS), Global Navigation Satellite System (GNSS), Galileo, Long Range Navigation (LORAN), National Marine Electronics Association (NMEA), Trimble Standard Interface Protocol (TSIP), DELORME® EARTHMATE®, Rockwell PLGR Protocol, iBeacon®, and SIRF®, to name a few non-limiting examples. It is also appreciated that the geographic position application 72 may include local, regional, or site-wide systems of a type well known in the art, such as radio frequency identification (RFID), infrared (IR), sensor networks, Wi-Fi-based positioning, and Ultra-Wideband (UWB) positioning systems, to name a few non-limiting examples. In one embodiment, the geographic position application 72 may work in conjunction with the people locator module 66 to determine the location of each user of each mobile device 26 relative to the plurality of lock assemblies 28.

Figure 4:
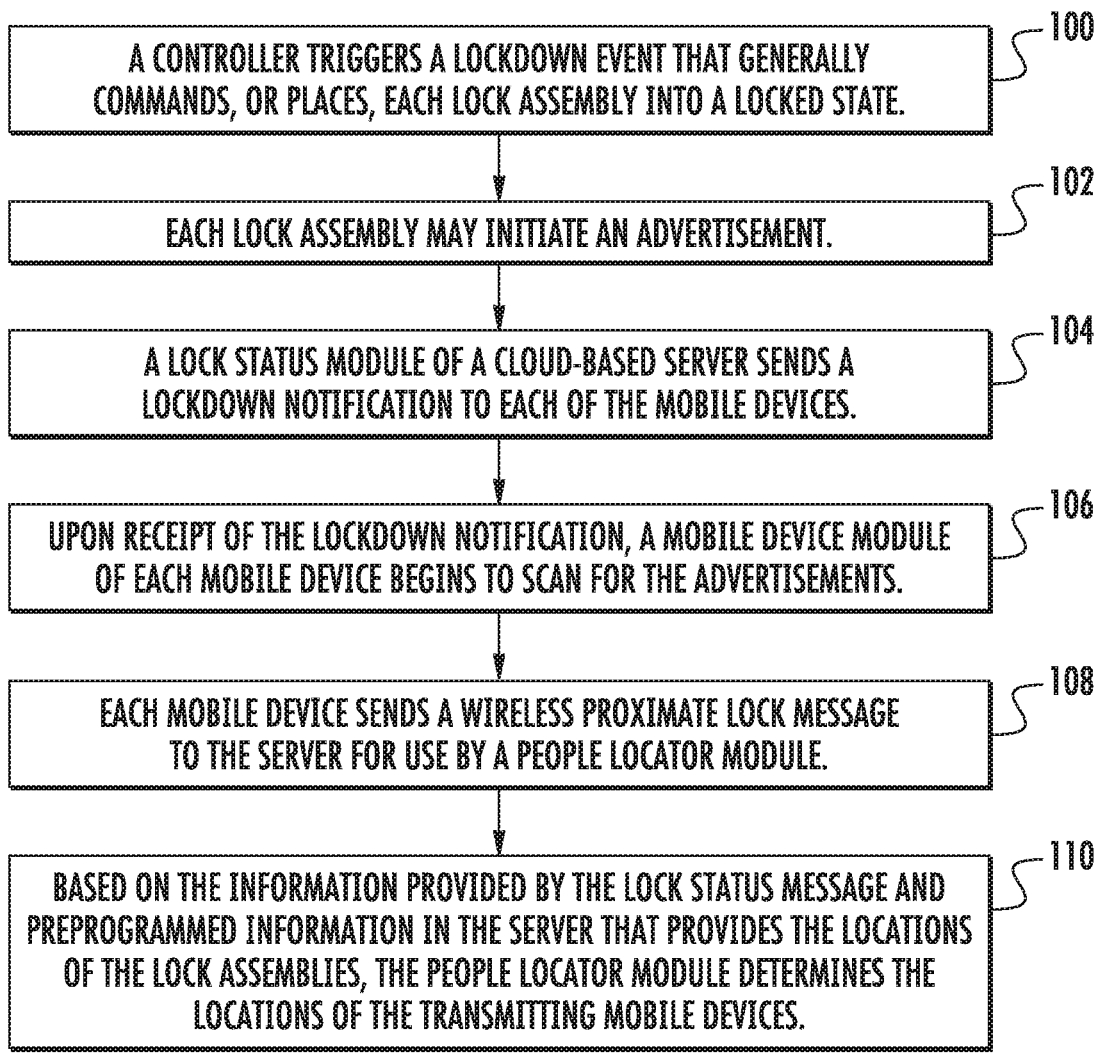
FIG. 4 is a flow chart illustrating a method of operating the regional lock-state control system.

Referring to FIG. 4, a method of operating the regional lock mode system 20 is illustrated. To simplify explanation, the example of a regional lockdown system 20 will be elaborated upon in terms of operation. At block 100, the controller 30 may trigger a lockdown event that generally commands, or places, each lock assembly 28 into a locked state. Upon the lockdown command (see arrows 74 in FIG. 1), and at block 102, each lock assembly 28 may initiate the advertisement 60. In one embodiment, the advertisement 60 may be wireless, may be a short range advertisement, and/or may be an advertisement sent via Bluetooth®. The lockdown command 74 may be sent over wired or wireless pathways.

At block 104, the status module 64 of the cloud-based server 30 may send a lockdown notification (see arrows 76 in FIG. 1) to each of the mobile devices 26. In one example, the region 22 may be a campus, and the lockdown notification 76 may be sent to every mobile device 26 (e.g., smartphone) on campus 22. At block 106, and upon receipt of the lockdown notification 76, the mobile device module 62 of each mobile device 26 may begin to scan for the advertisement 60, which may include an address of the specific lock assembly 28 and an indication that the lock assembly 28 is in the locked state or the unlocked state. It is contemplated and understood that the lockdown notification 76 may be a "push notification."

The mobile device module 62 for each mobile device 26 may be registered by a process of downloading the module from, for example, an application store and signing in with an account. The account may be obtained via various means, but the account may be associated with, or known by, the locator module 66. The account may be created by region 22 administrators who may create the account in one of the modules 66, 68, and provide to the user of the mobile device 26. Alternatively, the account may be created in a separate system (e.g., Facebook® or Google® login) and the account may be registered into the modules 66, 68 so that it is known. After logging into the module 62, the module 62 may communicate with the modules 66, 68 so that the modules 66, 68 are aware of every registered mobile device 26.

Optionally, the module 62 for each mobile device 26, may have functionality to download mobile credentials from a credential module 67 (see FIG. 1) that may be loaded into the server 30 of the control arrangement 24. The credential module 67 may provide access rights to the mobile devices 26 so that the users may open the lock assemblies 28 (i.e., unlock) with the mobile device 26 using techniques for mobile credentialing that include the transfer via Near Field Communications (NFC) or Bluetooth using the transceivers 52, 58, and other means generally known to one having skill in the art. Similarly, the lock assembly 28 may be configured to validate the command 86 as coming from the central control arrangement 24 via digital signature, encryption, and others. Authentication of command 86 may reduce, or eliminate, any chances of a nuisance lock-down message.

At block 108, each mobile device 26 may send a wireless status message (see arrow 78) to the server 30 for use by the people locator module 66. The status message 78 may include the signal strength of each advertisement 60 detected (i.e., or an averaging of recently received advertisements 60), the address of each advertisement 60, an address or identification of the associated mobile device 26, and the lock status of the associated lock assembly 28. It is further contemplated and understood that the status message 78 may be time stamped providing a "time-to-live" of the message that may enable other lock assemblies 28 to respond as long as the originating message remains valid.

Although not illustrated, portions of the notifications 76, commands 86, advertisements 60, and/or status messages 78 may also be sent mobile device 26 to mobile device 26, lock assembly 28 to lock assembly 28, mobile device 26 to lock assembly 28, and lock assembly 28 to mobile device 26. In one example, the "time-to-live" feature may generally be the notification 76 decaying over time (i.e., the time stamp has elapsed and the message has expired). This feature may also be included in the transfer of notifications 76 from mobile device 26 to mobile device 26, and/or may be included in the commands 86 from mobile device 26 to lock assembly 28, and/or the re-transfer of the command 86 between lock assemblies 28.

At block 110 and based on the information provided by the status message 78 and preprogrammed information in the server 30 that provides the locations of the lock assemblies 28, the people locator module 66 may determine the location of the transmitting mobile devices 26. That is, the server 30 may determine which users are located near which lock assemblies 28, and which lock assemblies are in the locked state. This may be accomplished by calculating distances based on signal strength or triangulation based upon multiple status messages 78. Or, it may be accomplished based on proximity alone (i.e., being near a lock assembly means the user must be at a particular location).

It is contemplated and understood that the status message 78 may further include information about the individual user of a particular mobile device 26. For example, the module 62 may provide, via the interface 50, an opportunity for a user to specify handicap conditions. The module 62 may also activate a microphone 82 of the mobile device 26 enabling the listening for sounds (e.g., gun shots) that may be sent as data included as part of the status message 78. Module 62 may also activate other features of the mobile device 26 such as phone position (e.g., gyroscope), camera (i.e. phone video), phone calls, and others. Other information that may be included as part of the status message 78 may be anything a user chooses to enter into the mobile device 26, such as the need for help due to, for example, an injury. Yet further, biometric information (e.g., heartbeat) may be included as part of the status message 78 indicating a user is in distress.

It is contemplated and understood that the sending of the lockdown notification 76 may be repetitious causing the system to reinitiate the determination of locations of the mobile devices 26. This re-initiation enables tracking of the users of the mobile devices 26 throughout the region 22. This repetition may continue until the server 30 sends a cease lockdown initiative to the mobile devices 26. By enabling the tracking of the mobile devices 26, a central command post (e.g., police or security station) may receive the tracking and other data from the server 30, and better plan and conduct, for example, evacuations of the region 22 based on the locations of the mobile devices 26. Such evacuations may be based upon population concentrations and dynamics. The users of the mobile devices 26 may be instructed via the interface 50 of the mobile devices 26.

It is further contemplated and understood, and similar to block 106, that the mobile device 26 may transmit an advertisement 80 (see FIG. 2) that includes the address of the respective mobile device. Other mobile devices 26 may receive the advertisements 80, and as part of the wireless status message 78, or as a separate message, may transmit the mobile device address data and signal strength relative to the advertisements 80 to the locator module 66. The locator module 66, via the advertisements 60, 80 may then use this data to determine the locations of the various mobile devices 26 relative to the lock assemblies 28 and relative to the other mobile devices 26.

Figure 5:
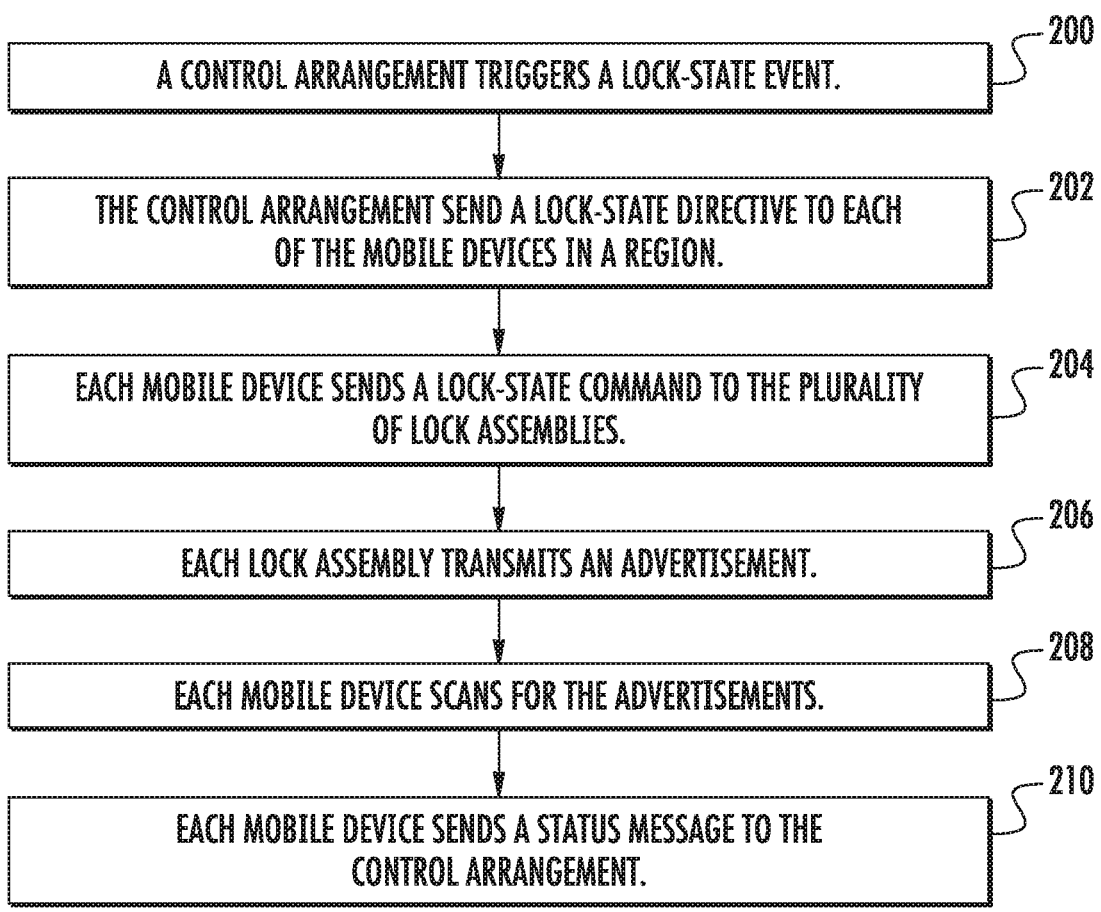
FIG. 5 is a flow chart illustrating a second embodiment of a method of operating the regional lock-state control system.

Referring to FIG. 5, a second embodiment of a method of operating the regional lock-state control system 20 is illustrated. At block 200, the control arrangement 24, which may be a cloud-based server, triggers a lock-state event that may be a lockdown event. At block 202, the control arrangement 24 sends a lock-state directive 76 to each of the plurality of mobile devices 26 in the region 22. The lock-state directive 76 may be a lockdown directive and may be sent wirelessly via, for example, a cellular network. Alternatively, the lock-state directive 76 may be an unlock directive. The lock-state directive may be generalized where a mobile device 26 is instructed to interact with any lock assembly 28, or may be specific to a lock assembly 28 if the location of the mobile device 26 is known to be near the particular lock assembly.

In one, non-limiting, embodiment of the regional lock-state control system 20, the system may include a combination of both lock and unlock behaviors with a region depending on how an administrator wants to filter human traffic through, for example, a building, or a region. More specifically, and in an example of a tornado event, certain doors may be locked to make sure people are directed to safer areas, and other doors may be unlocked so the people are assist toward those safe areas (e.g. basement areas) that may typically be inaccessible to the general public.

In one example, or scenario, of operation, a person with bad or illegal intentions (e.g., a shooter) may be on a college campus 22. An administrator, or first responder, with this information may trigger a lockdown event via the controller 32, which may be a centralized portal. The administrator may login with an identification and/or password that may place the lock-state control system 20 in a lockdown mode.

In another scenario, a fire alarm may be triggered that places the lock-state control system 20 into a pre-determined mode where certain lock assemblies 28 are unlocked via an unlock directive 76. This would permit personnel to leave, for example, a building 22. It is contemplated and understood that similar scenarios may include natural events (e.g., storms, earthquakes, tsunamis, hurricanes, tornadoes, and others), acts of war, and public health (i.e., outbreaks). Each scenario may include different, or modified, lock and phone behaviors.

At block 204 and upon receipt of the lock-state directive 76, each mobile device 26 may send a lock-state command 86 associated and reflective of the lock-state directive 76 to the plurality of lock assemblies 28. The lock-state command 86 may be applied in place of the command 74 previously described. Moreover, the lock-state command 86 may be sent over a wireless, short-range, protocol such as Bluetooth. It is further contemplated and understood that not all mobile devices 26 will be in Bluetooth range of all lock assemblies 28. However, the wide distribution of the mobile devices 26 is likely to be sufficient to distribute the command 86 to all of the lock assemblies 28. Regardless, each lock assembly 28 may also re-communicate the command 86 to other proximate lock assemblies 28 thereby assuring all lock assemblies have received the command. It is further contemplated and understood that this communication may apply to lock assemblies 28 that are off-line lock assemblies and have no direct communication with, for example, the controller 32 or the server 30. Yet further, the mobile devices 26 may communicate the command from one mobile device 26 within the network coverage to another mobile device 26 outside of the network coverage, and back-and-forth in this way, between lock assemblies 26 and mobile devices 26, to propagate the command.

In an application where the intent is to safely and efficiently evacuate people from a region 22, the limited range of communication between a mobile device 26 and any particular lock assembly 28 may have little negative effect. That is, if the lock-state command is an unlock command 86, and the mobile device 26 continues to transmit the command throughout the unlock event, the lock assembly 28 will unlock as the user of the mobile device 26 moves closer to the lock assembly.

At block 206 and upon receipt of the lock-state command 86, each lock assembly 28 may begin transmitting an advertisement 60 that may be wireless and short ranged (e.g., Bluetooth). Each advertisement 60 for each lock assembly 28 may include data that reflects the associated lock assembly's lock-state. Examples of a lock-state may include locked and unlocked states of a latch 88 of the lock assembly 28 (see FIG. 3), thrown and un-thrown states of a deadbolt 90 of the lock assembly 28, and open and closed positions of a door 92 that is coupled to and generally utilized the lock assembly 28. More specifically, if the lock-state command 86 is a lockdown command, the advertisement 60 may include data that indicates the latch 88 is in a locked state, the deadbolt 90 is in a thrown state, and the door 92 is in a closed position, thus indicating a secured orientation.

In one embodiment, the lock assemblies 28 may be configured to continuously send advertisements 60 indicating the assembly is either in a locked or unlocked state. Upon a lockdown event, the mobile devices 26 may not send a lockdown command 86 to the lock assemblies 28 that are already advertising a locked state. That is, the mobile devices 26 may only send a lockdown command 86 to the lock assemblies 28 advertising an unlocked state.

At block 208, the mobile devices 26 may scan for the advertisements 60. At block 210, the mobile devices 26 may send a status message 78 reflective of the scanned advertisements to the control arrangement 24. In one example, the data from the status message 78 may be used to inform an administrator of which doors are locked down, and/or the current status of a particular door with a particular lock assembly 28.

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. It is understood that an application running on a server and the server, may be a component. One or more applications may reside within a process and/or thread of execution and an application may be localized on one computer and/or distributed between two or more computers.

Advantages and benefits of the present disclosure include a regional lock-state control system 20 capable of leveraging phone network systems to locate and track people, monitor lock states, and gather other information when a region is in, for example, a lockdown event.

While the present disclosure is described with reference to illustrated embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of operating a regional lock-state system comprising:
   triggering a lock-state event at a plurality of lock assemblies by a control arrangement;
   responsive to the control arrangement triggering the lock-state event, sending by the control arrangement a lock-state directive to a plurality of mobile devices;
   wherein the lock-state directive comprises instructions to the plurality of mobile devices to interact with one or more of the plurality of lock assemblies;
   wherein each of the plurality of mobile devices is configured to, responsive to the lock-state directive, determine proximity data that is used to perform proximity operations comprising:
   determining distances from each of the plurality of mobile devices to each of the plurality of lock assemblies; and
   determining, for each of the plurality of mobile devices, a closest one of the plurality of lock assemblies; and
   using each of the plurality of mobile devices to send a status message to the control arrangement, the status message comprising the proximity data of the each of the plurality of mobile devices.

2. The method set forth in claim 1, further comprising:
   transmitting an advertisement by each one of the plurality of lock assemblies, wherein each of the plurality of mobile devices, responsive to the lock-state directive, uses the advertisement to determine the proximity data.

3. The method set forth in claim 2, further comprising:
   scanning for the advertisement by the plurality of mobile devices.

4. The method set forth in claim 3, further comprising:
   sending a status message to the control arrangement indicative of the scanned advertisements by the plurality of mobile devices.

5. The method set forth in claim 1, wherein the lock-state directive is sent over a cellular network and the lock-state command is sent over a short range communication protocol.

6. The method set forth in claim 1, wherein the lock state command is propagated between the plurality of mobile devices, between the plurality of lock assemblies, and from the plurality of lock assemblies to the plurality of mobile devices.

7. The method set forth in claim 1, further comprising:
   using the plurality of mobile devices to, responsive to the lock-state directive, send a lock-state command to the plurality of lock assemblies;
   using each of the plurality of lock assemblies to, responsive to the lock-state command, transmit an advertisement that includes data on a lock-state;
   further using each of the plurality of mobile devices to, responsive to the lock-state directive, use the advertisement to determine the proximity data; and
   the data on a lock state includes locked and unlocked states.

8. The method set forth in claim 1, further comprising using the control arrangement to perform the proximity operations.

9. The method set forth in claim 1, further comprising sending the proximity data to a command post that uses the proximity data to develop a response plan for responding to the lock-down event.

* * * * *